April 18, 1950     C. K. COOK     2,504,393
SHOCK ABSORBER FOR WHEEL PULLERS
Filed Dec. 15, 1947
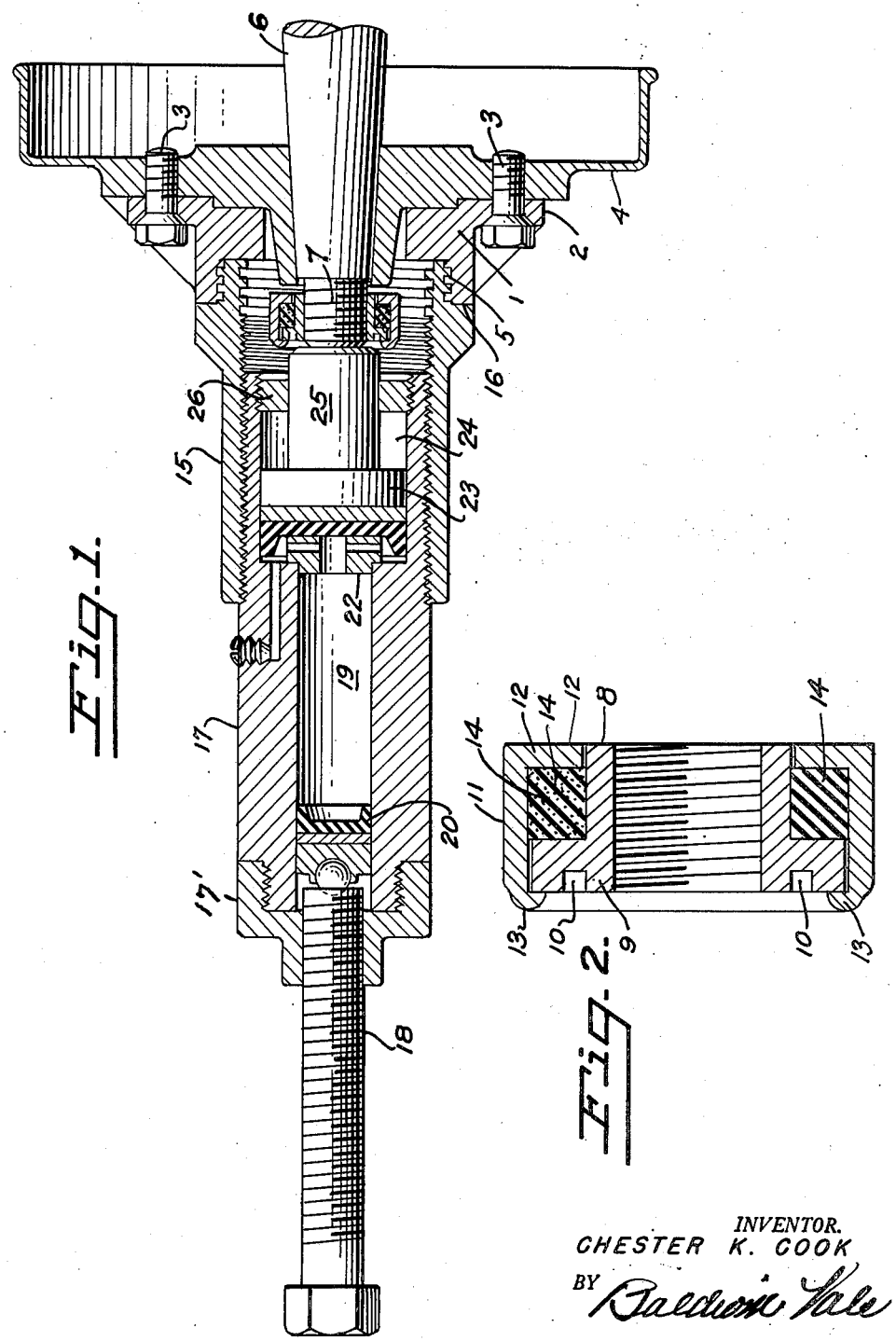
INVENTOR.
CHESTER K. COOK
BY
ATTORNEY Patented Apr. 18, 1950

2,504,393

UNITED STATES PATENT OFFICE 2,504,393

SHOCK ABSORBER FOR WHEEL PULLERS

Chester K. Cook, Vallejo, Calif.

Application December 15, 1947, Serial No. 791,880

1 Claim. (Cl. 267—1)

This invention relates to a shock absorber for wheel pullers.

Among the objects of the invention is the elimination of the reaction shock incidental to the use of mechanical and hydraulic wheel pullers in the automotive and other servicing trades.

Another object is the provision of a simple, compact shock absorber adaptable to conventional practice in the removal of vehicle wheels from axles, and gears, turbine rotors, and the like, keyed or frictionally mounted upon supporting shafts.

The present disclosure will illustrate a hydraulic wheel puller for vehicle wheels, having this invention applied thereto.

The mode of operation is based upon Newton's third law of motion "To every action there is always an equal reaction, or if a force acts to change the state of motion of a body, the body offers a resistance equal and directly opposite to the force. If two forces act in opposite directions, then their resultant is equal to their difference, and the direction of the resultant is the same as the direction of the greater of the two forces."

The truth of the above law is dangerously manifested in the use of conventional pullers in automotive practice, in which the puller is attached to the wheel hub, and exerts pressure against the end of the tapered axle upon which the hub is frictionally wedged. In many cases a pressure of many tons is required to unseat a hub that may be rusted on the tapered axle. When the hub "lets go" the pulling jack may be shot outwardly several feet, endangering the operator. The resultant reactive shock often seriously damages the axle bearings, differential gearing and the general axle assembly. In the case of an automobile, dry mud is dislodged from the inside of the fenders, showering grit into exposed parts.

Other objects and advantages will appear as the description proceeds. In the specification and the accompanying drawings the invention is shown in its preferred form. But it is to be understood that it is not limited to this form; because it may be embodied in modifications within the spirit of the invention as defined in the claim following the description.

In the one sheet of drawings:

Fig. 1 is a longitudinal section of a wheel puller having this invention interposed between the puller jack mounted upon the wheel hub and the threaded end of the tapered axle.

Fig. 2 is an enlarged detail in vertical section of the shock absorber or safety nut.

In detail the structure shown in Fig. 1, comprises the adapter chuck 1 having the flange 2, bolted as at 3, 3, to the brake drum hub 4, the disc wheel having been removed from the hub.

The outer end of the chuck 1, is internally threaded at 5.

The hub 4 is forced on the tapered axle 6, by a nut, not shown, threaded on the end 7 of the axle and bearing against the outer end of the hub, in the usual manner.

The shock absorber comprises the nut 8, having the flange 9 and internally threaded to screw on the threaded end 7 of the axle 6. The flange is provided with the spanner sockets such as 10 to receive a spanner for rotating the nut on the axle.

The nut is enclosed within the cup 11 having the inturned impact flange 12 and the inturned bead 13, with the cushion 14 interposed between the flanges 9 and 12 within the cup 10. This resilient cushion 14 is preferably composed of sponge rubber or plastic compound, adapted to impound air which absorbs the shock as the cushion is compressed, as hereinafter more fully described.

The hydraulic jack has the sleeve 15, externally threaded into the chuck 4 at 5 and has the shoulder abutting the chuck at 16. This supports the pressure jack in the chuck 1 that is bolted to the hub assembly. The reduced end of the knurled body 17 is adjustably threaded and telescopes within the sleeve 15. The body 17 has the end cap 17', with the jack screw 18 projecting therethrough, co-axially with the low pressure chamber 19.

The piston 20 is advanced in the chamber 19 by the jack screw 18 and displaces the liquid therein through the bushing 22, against the piston 23 slidable within the high pressure cylinder 24. The piston stem 25 is guided in the plug 26, closing the end of the body 17. This stem abuts the threaded end 7 of the tapered axle.

The invention operates substantially as follows: The body 17 is screwed into the sleeve 15 until the piston stem 25 abuts the end 7 of the axle. Continued screwing of the body into the sleeve causes the secondary piston 23 to displace the liquid until the primary piston 20 abuts the inner end of the jack screw 18.

When the jack screw is advanced through the cap 17' it displaces the liquid and forces the piston stem 25 against the end 7 of the axle until sufficient pressure is built up in the cylinders 19 and 24 to pull the hub 4 off the tapered axle 6. If the hub is rusted on to the axle taper, several tons of hydraulic pressure may be exerted against the axle before the hub "lets go" often with a violent bang.

When the hub 4 lets go from the axle the outer end of the hub violently impacts the casehardened flange 12 and compresses the air impounded in the cushion 14 against the nut flange 9. This completely eliminates the incidental shock, as previously described.

The shock absorbing nut assembly shown in Fig. 2 is equally adaptable to mechanical pullers in which the equivalent of the jack screw 18 is applied directly to the end 7 of the axle. But the hydraulic form of puller shown is preferred because of its greater efficiency and smoother operation in combination with the shock absorber above described.

Having fully described this invention and its mode of operation, what I claim and desire to secure by Letters Patent is:

A shock absorber for wheel pullers comprising an annular cup having an inturned impact flange and an inturned bead on its opposite ends respectively; a threaded nut slidable within the opening of said impact flange and having an external flange bearing against said bead within said cup and means thereon for turning said nut; and a rubber-like cushion interposed between said impact flange and said annular flange within said cup.

CHESTER K. COOK.

REFERENCES CITED

The following references are of record in the file of this patent:

UNITED STATES PATENTS

| Number | Name | Date |
| --- | --- | --- |
| 1,964,524 | McIntosh | June 26, 1934 |
| 2,005,103 | Moorhouse | June 18, 1935 |
| 2,331,167 | Brecht et al. | Oct. 5, 1943 |

FOREIGN PATENTS

| Number | Country | Date |
| --- | --- | --- |
| 472,569 | Great Britain | Sept. 27, 1937 |
| 532,394 | Great Britain | Jan. 23, 1941 |
| 868,631 | France | Oct. 13, 1941 |